(12) United States Patent
Goncalves

(10) Patent No.: US 9,268,137 B2
(45) Date of Patent: Feb. 23, 2016

(54) MEANS FOR DYNAMICALLY REGULATING THE TIME-OUT CHARACTERISTICS OF A DISPLAY OF AN ELECTRONIC DEVICE

(71) Applicant: MOTOROLA MOBILITY LLC, Libertyville, IL (US)

(72) Inventor: Alex G. Goncalves, Sunnyvale, CA (US)

(73) Assignee: Google Technology Holdings LLC, Mountain View, CA (US)

(\*) Notice: Subject to any disclaimer, the term of this patent is extended or adjusted under 35 U.S.C. 154(b) by 142 days.

(21) Appl. No.: 13/971,063

(22) Filed: Aug. 20, 2013

(65) Prior Publication Data

US 2014/0361955 A1    Dec. 11, 2014

Related U.S. Application Data

(60) Provisional application No. 61/833,612, filed on Jun. 11, 2013.

(51) Int. Cl.
*G02B 27/01* (2006.01)
*G06F 1/00* (2006.01)

(52) U.S. Cl.
CPC ............... *G02B 27/017* (2013.01); *G06F 1/00* (2013.01); *G02B 2027/014* (2013.01); *G02B 2027/0138* (2013.01); *G02B 2027/0178* (2013.01)

(58) Field of Classification Search
CPC ............. G02B 27/017; G02B 27/0093; G02B 2027/0138; G02B 2027/014; G02B 2027/0178; G06F 1/00
USPC ......................................................... 345/7–9
See application file for complete search history.

(56) References Cited

U.S. PATENT DOCUMENTS

| | | | |
|---|---|---|---|
| 5,153,580 A * | 10/1992 | Pollack ...................... | 340/309.9 |
| 2008/0246694 A1 * | 10/2008 | Fischer ............................ | 345/9 |
| 2013/0084805 A1 * | 4/2013 | Pasquero et al. ............. | 455/41.2 |
| 2014/0208145 A1 * | 7/2014 | Piccolotto et al. ............ | 713/324 |

FOREIGN PATENT DOCUMENTS

WO    2013017732 A1    2/2013

\* cited by examiner

*Primary Examiner* — Premal Patel
*Assistant Examiner* — Sarvesh J Nadkarni
(74) *Attorney, Agent, or Firm* — Shumaker & Sieffert, P.A.

(57) ABSTRACT

A method, electronic device and user-wearable device for improving user-interaction with an electronic device whose display periodically transitions into a sleep state due to perceived non-viewing of the electronic device. A processor initiates a sleep state timer that, upon expiration, triggers the display to transition from an active state to a sleep state. The processor determines whether the sleep state timer has less than a time remaining threshold before the timer expires. In response to determining that the sleep state timer has less than the threshold time remaining, the processor determines whether the display is being actively viewed by a user-wearable device. The processor enables the display to transition to the sleep state at expiration of the sleep state timer in response to determining that the display is not being actively viewed. The processor resets the sleep state timer in response to determining that the display is being actively viewed.

8 Claims, 12 Drawing Sheets

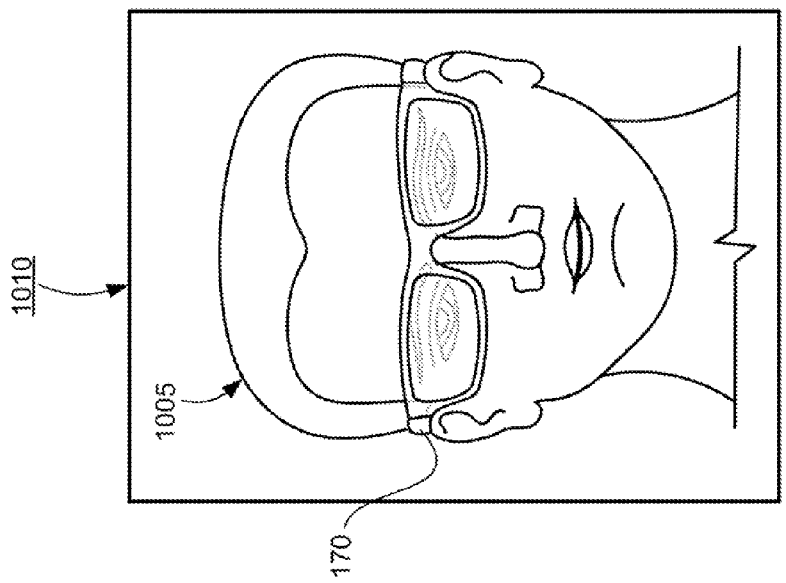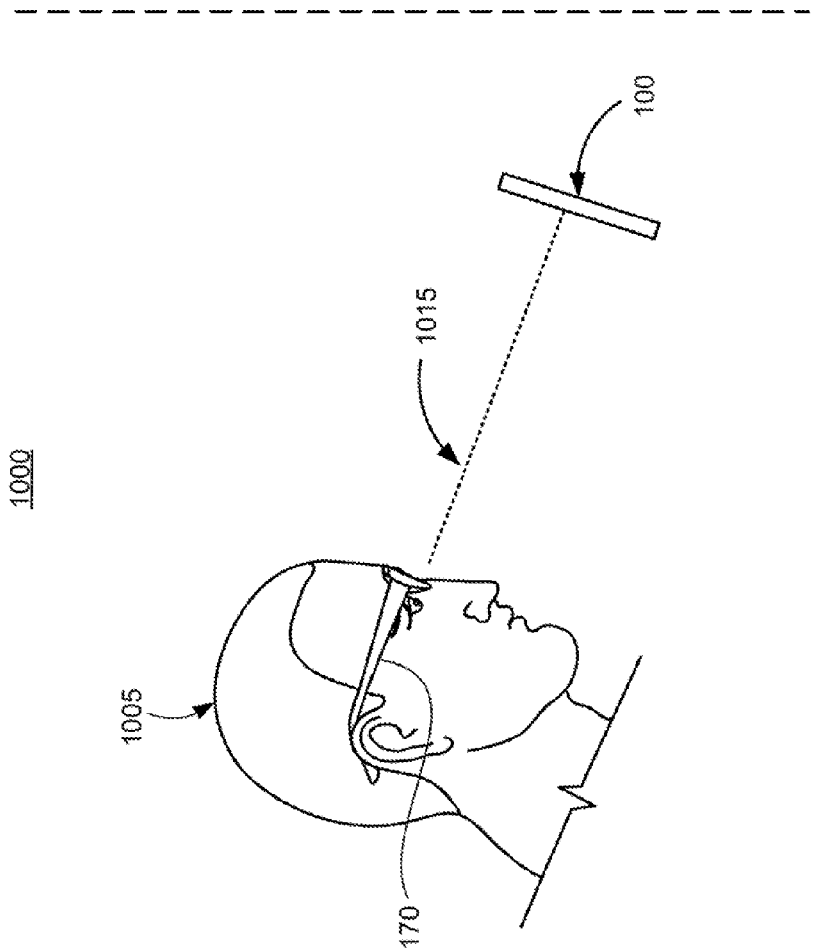
FIG. 10

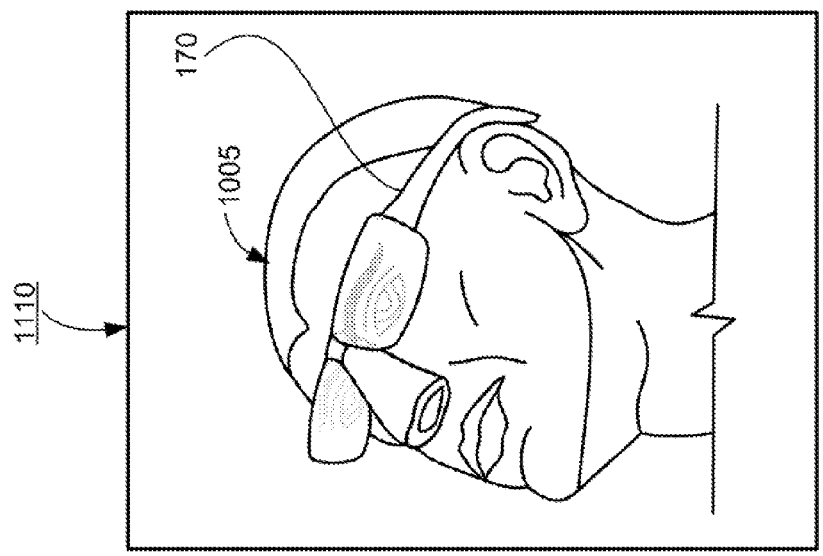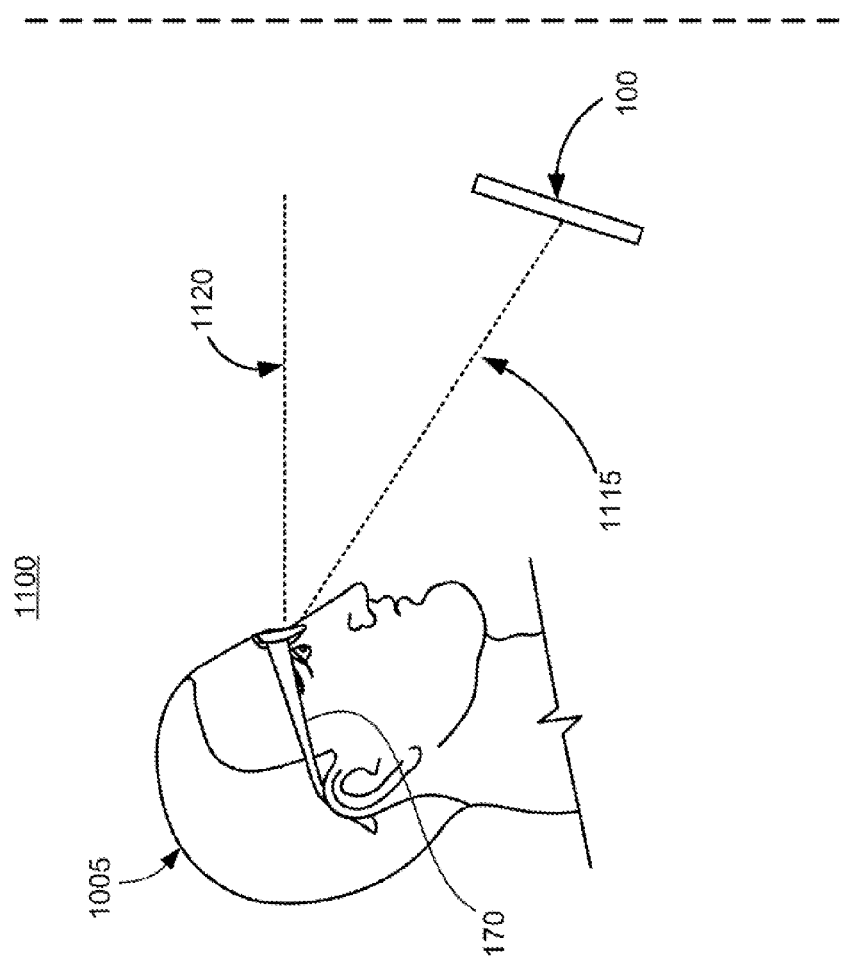
FIG. 11

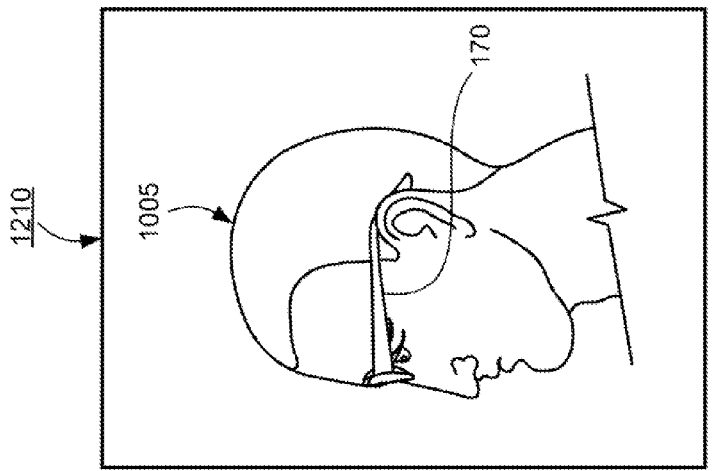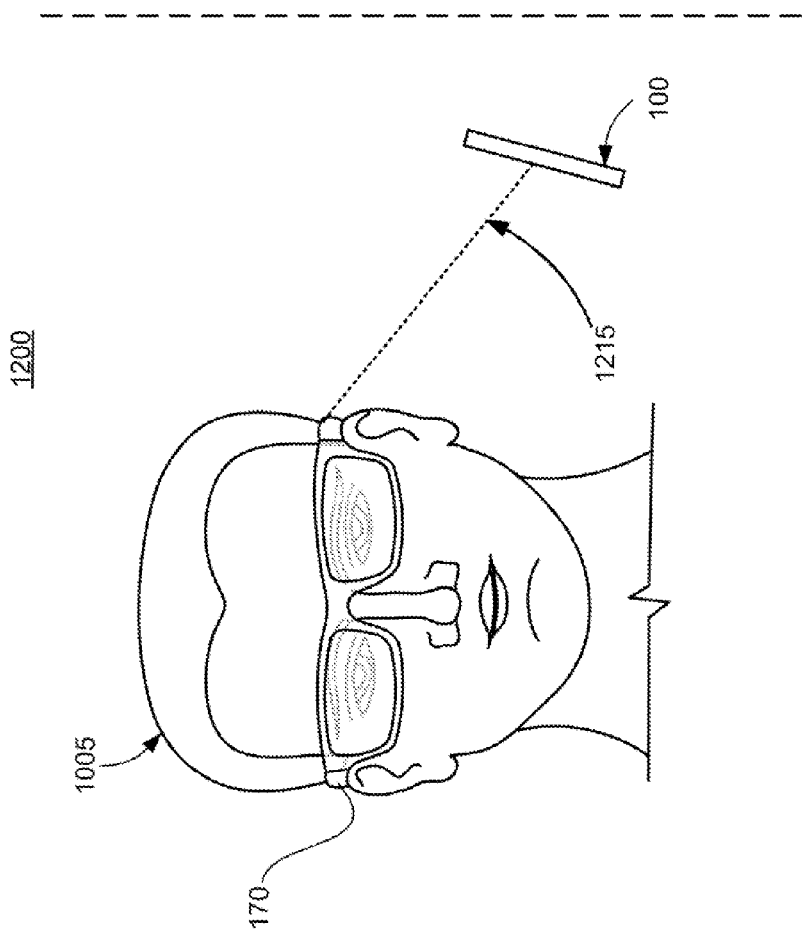
FIG. 12

MEANS FOR DYNAMICALLY REGULATING THE TIME-OUT CHARACTERISTICS OF A DISPLAY OF AN ELECTRONIC DEVICE

BACKGROUND

1. Technical Field

The present disclosure generally relates to electronic devices. More specifically, the present disclosure relates to regulating the time-out characteristics of a display of an electronic device.

2. Description of the Related Art

Electronic devices such as computers and mobile phones are extremely popular and enjoy wide spread acceptance in our society. These electronic devices have a display that is used to display visual content to a user. The electronic devices commonly include a mechanism to power down (i.e., place in low power mode) the display in order to conserve battery power. Typically, the electronic device can place the display into a non-functional or blank state after a period of time when no user input has occurred.

Unfortunately, the electronic device's display frequently transition into the non-functional or blank state while a user is still in the process of reading or viewing the content of the display. The user is then required to manually apply a user input in order to awaken the display from the non-functional state. The electronic device then refreshes the display with the visually displayed content. The frequent transitioning of the mobile device display from an active state to an inactive state, while actually being viewed by a user, is annoying and irritating to the user. It is desirable to improve the viewing experience of a user of these electronic devices by keeping the device's display in an active state while being viewed.

BRIEF DESCRIPTION OF THE DRAWINGS

The description of the illustrative embodiments is to be read in conjunction with the accompanying drawings, wherein:

FIG. 10 illustrates a diagrammatic representation of a captured image showing a user looking at and actively viewing the display of the mobile device, according to one embodiment;

FIG. 11 illustrates a diagrammatic representation of a captured image showing a user looking up and not actively viewing the display of the mobile device, according to one embodiment; and FIG. 12 illustrates another diagrammatic representation of a captured image showing a user looking sideways and not actively viewing the display of the mobile device, according to one embodiment.

DETAILED DESCRIPTION

Figure 1:
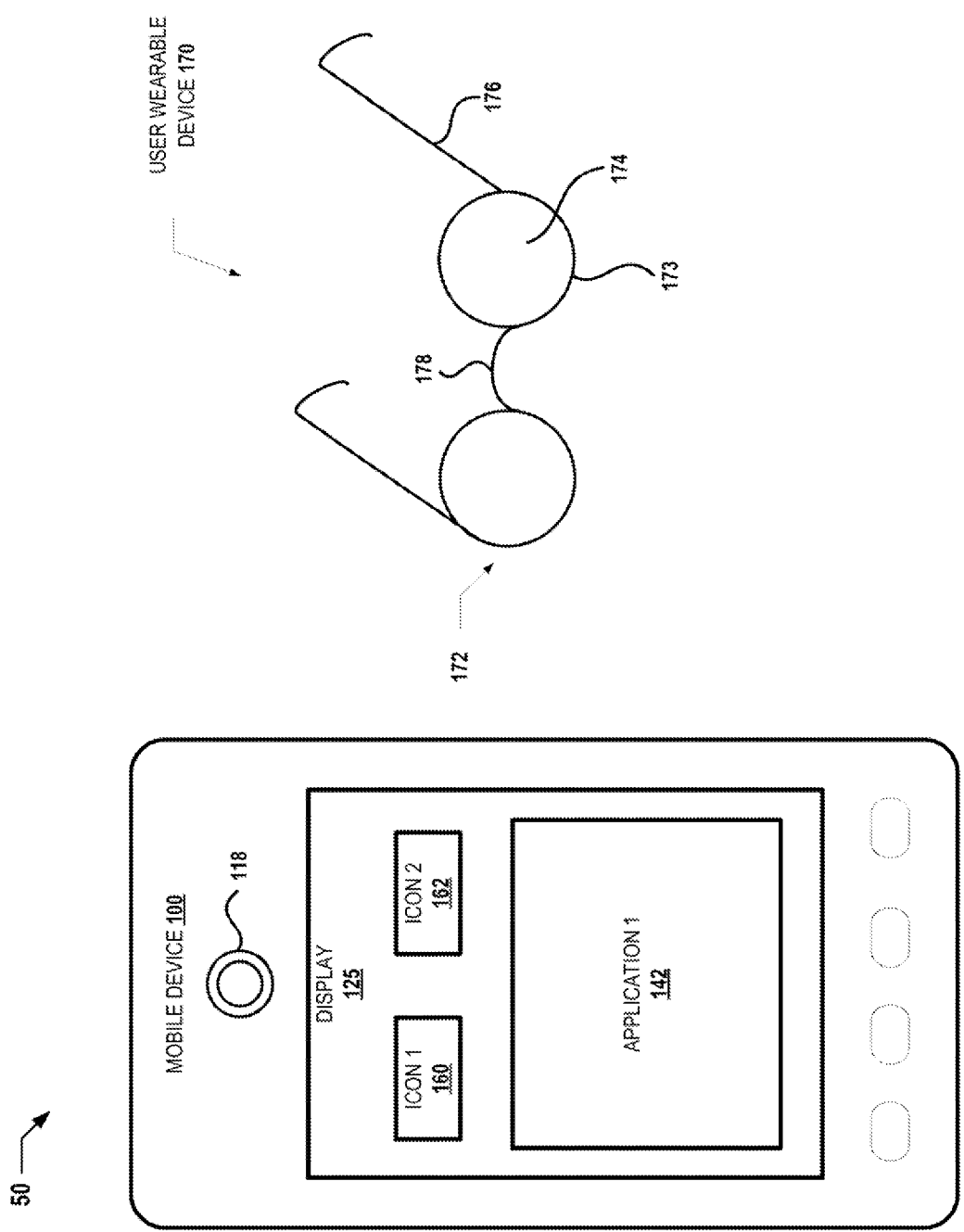
FIG. 1 illustrates a diagrammatic representation of an example environment that includes a mobile electronic device and a user-wearable device, according to one embodiment.

The illustrative embodiments provide a method, electronic device and user-wearable device for improving user-interaction with an electronic device whose display periodically transitions into a sleep state due to perceived inactivity of the electronic device. A processor initiates a sleep state timer that, upon expiration, triggers the display to transition from an active state to a sleep state. The processor determines if the sleep state timer has less than a pre-established time remaining before the timer expires. In response to the sleep state timer having less than the pre-established time remaining, the processor determines whether the display is being actively viewed by a user-wearable device. The processor enables the display to transition to the sleep state at expiration of the sleep state timer in response to determining that the display is not being actively viewed. The processor resets the sleep state timer in response to determining that the display is being actively viewed.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

Those of ordinary skill in the art will appreciate that the hardware components and basic configuration depicted in FIGS. 1-5 may vary. The illustrative components within mobile electronic device 100 and user-wearable device 300 are not intended to be exhaustive, but rather are representative to highlight essential components that can be utilized to implement aspects of the present disclosure. For example, other devices/components may be used in addition to or in place of the hardware depicted. The depicted example is not meant to imply architectural or other limitations with respect to the presently described embodiments and/or the general concepts presented by the disclosure. As a general extension of the disclosure, the electronic device aspects described herein as being implemented within or involving a mobile electronic device, illustrated as a mobile phone, are understood to be only a specific example or representation of an electronic device that has a display whose screen periodically times out due to inactivity of the device. The described functionality is particularly applicable to a computer system, including a desktop, laptop, tablet, or other type of computing device and may not necessarily be a mobile electronic device.

With reference now to the figures, and beginning with FIG. 1, there is depicted an environment that includes an electronic device 100 and a user-wearable device 170. For purposes of the description of illustrative embodiments, electronic device 100 is illustrated and described as a mobile electronic device or mobile device 100. Mobile device 100 can be one of a wide variety of digital/electronic devices that can communicate via wireless transmission over a wireless network, including devices such as a mobile phone, smartphone, personal digital assistant, tablet computer or other digital device. Mobile device 100 includes an image capture device 118, such as a camera, and a display 125, which for purposes of the description herein can be interchangeably referred to as display screen 125. Image capture device 118 can capture images of objects and scenes in the field of view of image capture device 118. The field of view of image capture device 118 is dependent upon the focal length of the camera lens and the location/orientation of mobile device 100. Display 125 and/or display screen 125 can display user viewable content generated and/or received by mobile device 100. In one embodiment, display 125 can visually present various icons, including icon 1 160 and icon 2 162. The icons can be used to launch various functions and applications to be displayed on display 125 such as application 1 142.

User-wearable device 170 can be any object that is wearable by a user. In one embodiment, user-wearable device 170 is a pair of eye glasses that are worn by a user. In other embodiments, user-wearable device 170 can comprise hats, goggles, headphones, ear buds, and other items utilized to determine the presence and active viewing of a user of the mobile device 100. In the illustrated example of the eyeglasses, user-wearable device 170 includes a support frame 172 that has a pair of lens holders 173 connected by a nose bridge 178. Lenses 174 are mounted in lens holders 173. Temples 176 are connected to opposing sides of lens holders 173 and extend away from support frame 172. When worn by a user the nose bridge 178 rests over the nose of the user and a back end of temples 176 rest over the ears of the user.

Figure 2:
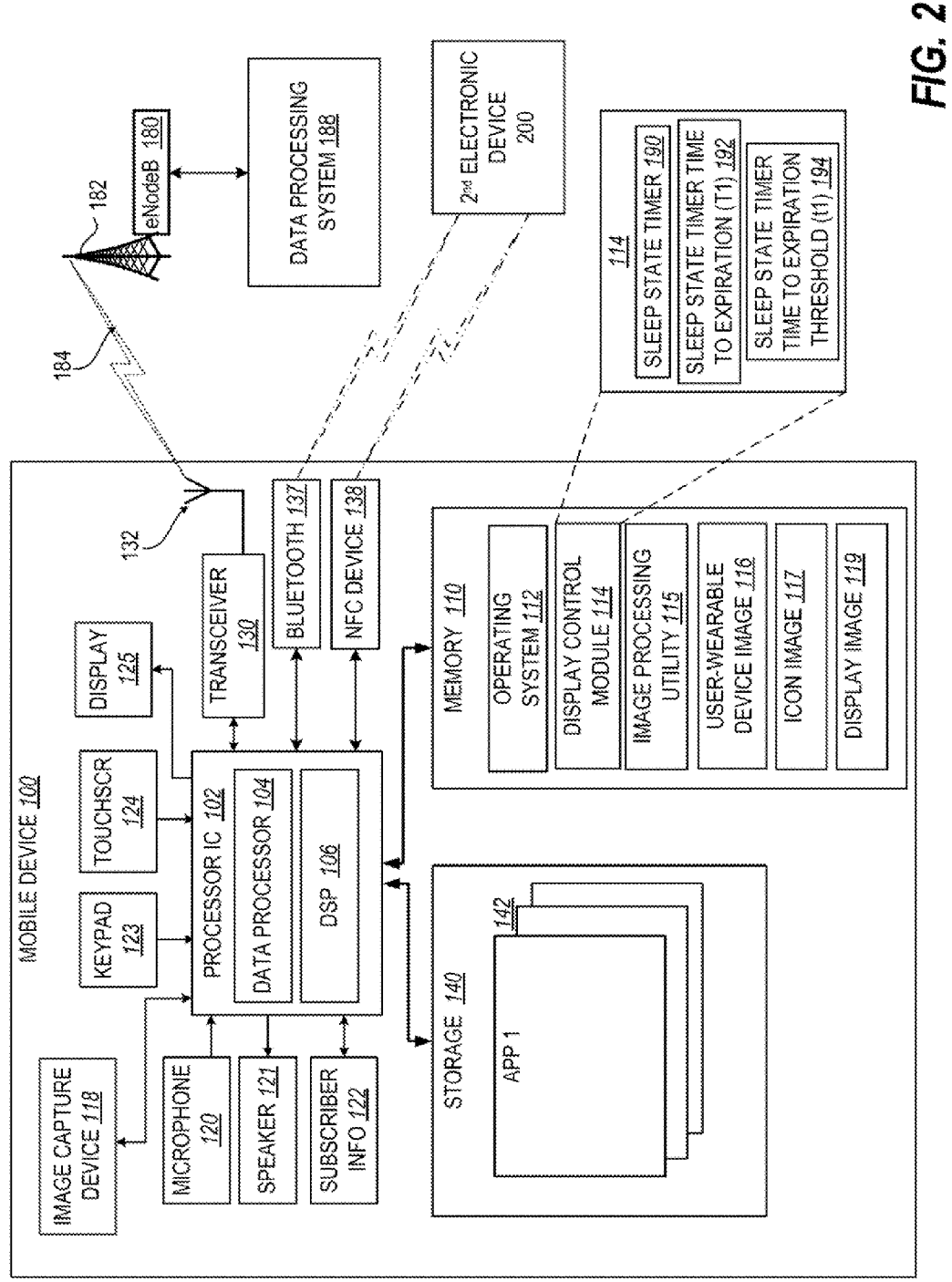
FIG. 2 illustrates a block diagram representation of an example mobile electronic device connected to a wireless network, according to one embodiment.

In the description of each of the following figures, reference is also made to elements described in one or more preceding figures. FIG. 2 illustrates an example mobile device 100 connected to a wireless network. Mobile device 100 is communicatively coupled to data processing system (DPS) 188 via a wireless interface 184, through an evolved Node B (eNodeB) 180 and associated base station antenna 182. With this embodiment, first mobile device 100 can be one of a wide variety of digital/electronic devices that can communicate via wireless transmission over a wireless network, including devices such as a mobile phone, smartphone, personal digital assistant, tablet computer or other digital device.

Mobile device 100 includes a processor integrated circuit (IC) 102 that has a data processor 104 and a digital signal processor 106. Processor IC 102 is in communication with memory 110 and storage 140 via a bus or direct connection. Memory 110 is a computer readable storage medium/device that stores data and software programs and code that can be executed on processor IC 102. In one embodiment, memory 110 is a non-volatile memory. Memory 110 can contain operating system 112, display control module 114, image processing utility 115, user-wearable device image 116, icon image 117 and mobile device display image 119.

Operating system 112 manages the hardware resources of mobile device 100 and provides common services for software applications. Display control module 114 executes on processor IC 102 to control the operation of display 125 and to perform various functional processes described herein. Image processing utility 115 executes on processor IC 102 to analyze images captured by image capture device 118, in one embodiment, or analyze images returned to mobile device 100 from a user wearable device 170 in another embodiment. User-wearable device image 116 is a stored image of one or more known user-wearable device, and icon image 117 is a stored image of a known icon that can be displayed on display 125.

Storage 140 is a computer readable storage medium/device that stores data and software programs and code that can be executed on processor IC 102. In one embodiment, storage 140 is a non-volatile memory. Storage 140 includes one or more software applications (APP) 142, an example of which is shown as APP 1. Software applications 142 execute on processor IC 102 to perform various functional processes. In one example embodiment, software applications 142 can cause mobile device 100 to be linked to and send and receive data from a user wearable device.

Mobile device 100 further comprises an image capture device 118, a microphone 120, a speaker 121, a keypad 123, a touch screen 124 and a display 125 all of which are connected to processor IC 102. Mobile device 100 accepts user input using microphone 120, keypad 123 and touch screen 124. Mobile device 100 provides audio output to a user via speaker 121 and visual output via display 125. Subscriber information module 122 is communicatively coupled to processor IC 102. Subscriber information module 122 can be a removable memory module that contains encrypted access data that allows mobile device 100 to access a wireless network via eNodeB 180. Mobile device 100 also has a Bluetooth transceiver 137 and a near field communication transceiver (NFC) 138. Bluetooth device 137 and NFC device 138 are in communication with processor IC 102. Bluetooth device 137 and NFC device 138 allow for mobile device 100 to communicate with similarly equipped devices, illustrated as second electronic device 200, in close proximity or over a short range. As provided by one or more embodiments described herein, second electronic device 200 can be an example user wearable device.

Mobile device 100 further includes a transceiver 130 that is communicatively coupled to processor IC 102 and to antenna 132. Transceiver 130 allows for wide-area or local wireless communication between mobile device 100 and eNodeB 180 via a wireless signal 184. Mobile device 100 can be communicatively coupled to and in communication with DPS 188 via a communication path involving transceiver 130, antenna 132, wireless signal 184 and eNodeB 180. Mobile device 100 is capable of wide-area or local wireless communication with other mobile wireless devices or with eNodeB 180 that are at a fixed location. DPS 188 can transmit data and software to first mobile device 100 and receive data transmitted from mobile device 100 and other mobile devices connected to the wireless network.

Display control module 114 further includes a sleep state timer 190, sleep state timer "time to expiration" (T1) 192 and sleep state timer time to expiration threshold (t1) 194. Sleep state timer 190 tracks the time until display 125 transitions from an active state to a sleep state. In one embodiment, the time period of sleep state timer 190 is pre-established. When sleep state timer 190 expires, processor IC 102 triggers display 125 to transition from an active state to a sleep state. When the display 125 transitions from a sleep state to an active state, processor IC 102 starts sleep state timer 190. In one embodiment, sleep state timer time to expiration (T1) 192 is the time remaining before the sleep state timer expires. Sleep state timer time to expiration threshold (t1) 194 is a pre-established threshold or minimum value of sleep state timer time to expiration 192. In an embodiment, when the sleep state timer time to expiration (T1) 192 is less than the sleep state timer time to expiration threshold (t1) 194, processor IC 102 can perform various functional processes to determine whether the display 125 should transition to an inactive state or should remain in an active state.

In one embodiment, processor IC 102 initiates a sleep state timer 190 that, upon expiration, triggers the display 125 to transition from an active state to a sleep state. The processor determines whether the sleep state timer time to expiration 192 is less than a time remaining threshold 194 before the timer expires. In response to determining that the sleep state timer time to expiration is less than the time remaining threshold, the processor determines whether the display is being actively viewed by a user-wearable device 170. The processor enables the display to transition to the sleep state at expiration of the sleep state timer in response to determining that the display is not being actively viewed. The processor resets the sleep state timer in response to determining that the display is being actively viewed.

Figure 3:
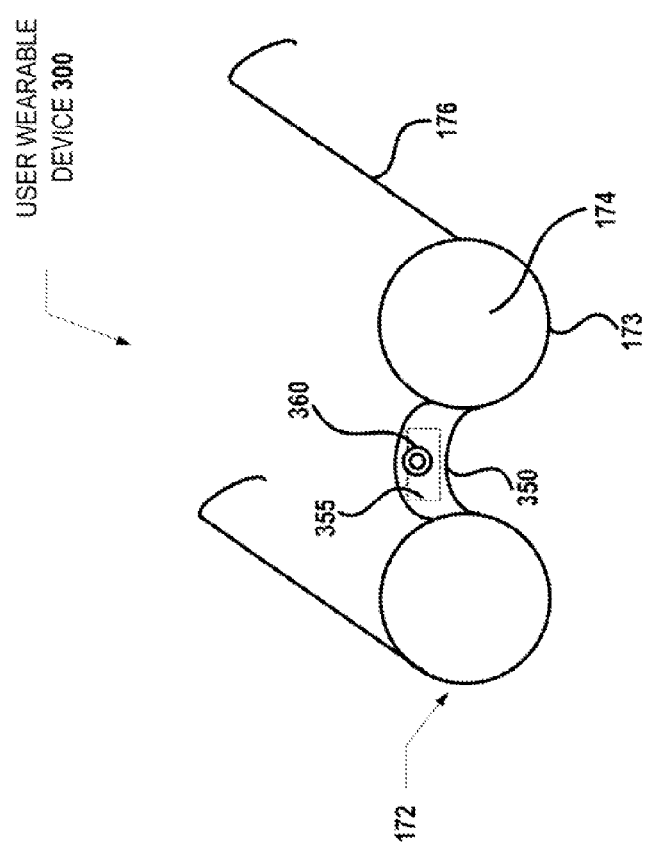
FIG. 3 illustrates a diagrammatic representation of another user-wearable device, according to one embodiment.

Referring to FIG. 3, there is illustrated another embodiment of a user-wearable device 300. In one embodiment, user-wearable device 300 is a pair of eye glasses that are worn by a user. User-wearable device 300 includes a support frame 172 that has a pair of lens holders 173 connected by a nose bridge housing 350. Lenses 174 are mounted in lens holders 173. Temples 176 are connected to opposing sides of lens holders 173 and extend away from support frame 172. When worn by a user, the nose bridge housing 350 rests over the nose of the user and the back end of temples 176 rest over the ears of the user. The nose bridge housing 350 encloses a hollow interior cavity.

Various components can be mounted within nose bridge housing 350. In one embodiment, nose bridge housing 350 contains electronic components 355 (shown in dashed outline lines to indicate location within the interior cavity) and an image capture device 360. Image capture device 360 can capture images of objects and scenes in the field of view of image capture device 360. The field of view of image capture device 360 is dependent upon the focal length of the camera lens and the location/orientation of user-wearable device 300. In general, the field of view of image capture device 360 corresponds to the direction of view of the wearer of user-wearable device 300.

Figure 4:
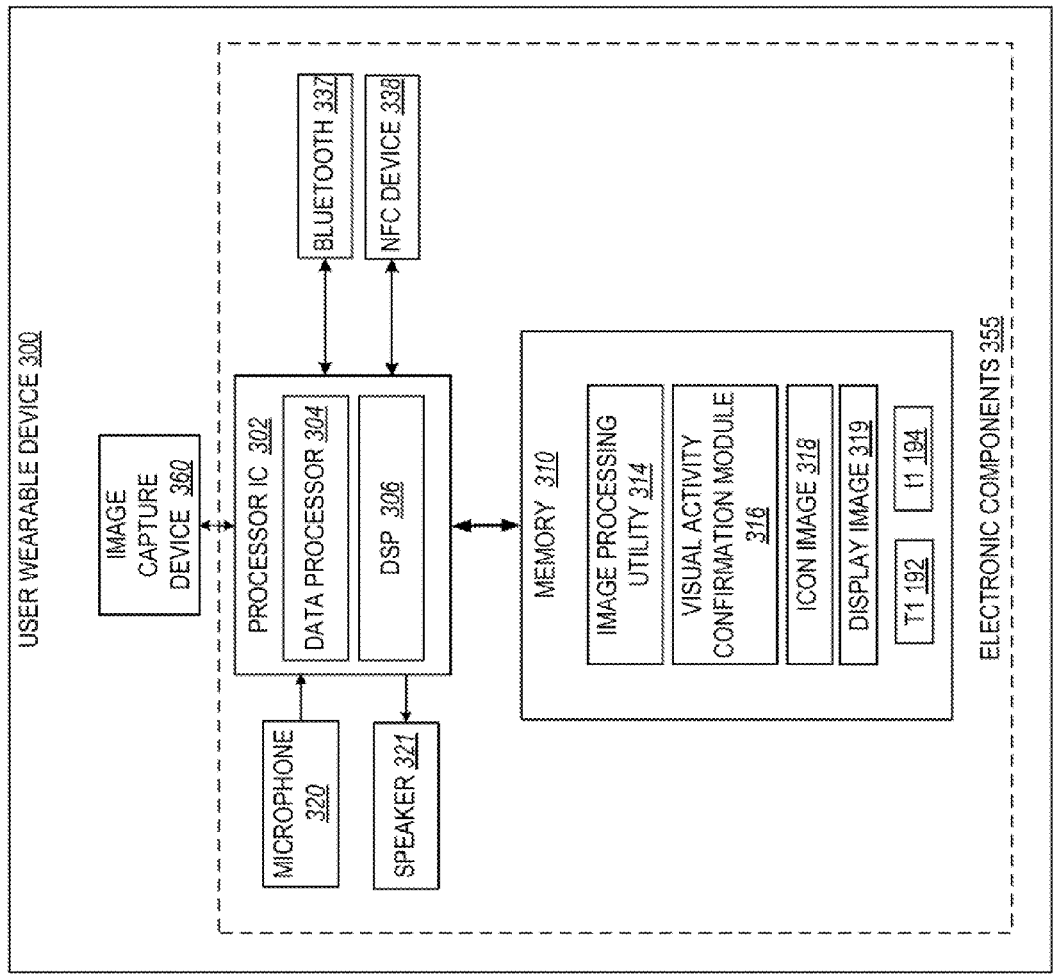
FIG. 4 illustrates a block diagram representation of an example user-wearable device, according to one embodiment.

FIG. 4 illustrates further details of user-wearable device 300 and specifically the electronics components 355 referenced in FIG. 3. User-wearable device 300 includes a processor integrated circuit (IC) 302 that has a data processor 304 and a digital signal processor 306. Processor IC 302 is in communication with memory 310 via a bus or direct connection. Memory 310 is a computer readable storage medium/device that stores data and software programs and code that can be executed on processor IC 302. In one embodiment, memory 310 is a non-volatile memory. Memory 310 can contain image processing utility 314, visual activity confirmation module 316 and icon image 318. Memory 310 can also contain local copies of T1 191 and t1 194, in one embodiment.

Image processing utility 314 executes on processor IC 302 to analyze images captured by image capture device 360. Visual activity confirmation module 316 executes on processor IC 302 to determine whether a user is actively viewing display 125 of mobile device 100. Icon image 318 is a stored image of a corresponding specific icon that can be displayed on display 125 of mobile device 100 and can be utilized to confirm whether the display of mobile device 100 is being actively viewed.

User-wearable device 300 can further comprise microphone 320 and speaker 321 which are connected to processor IC 302. Image capture device 360 is also connected to and in communication with processor IC 302. User-wearable device 300 accepts user input using microphone 320 and provides audio output to a user via speaker 321. User-wearable device 300 also has a Bluetooth transceiver 337 and/or a near field communication (NFC) transceiver 338. Bluetooth transceiver 337 and NFC transceiver 338 are in communication with processor IC 302. Bluetooth transceiver 337 can communicate with Bluetooth transceiver 137 of mobile device 100 when user-wearable device 300 is in close proximity to mobile device 100. Similarly, NFC transceiver 338 can communicate with NFC transceiver 138 of mobile device 100 when user-wearable device 300 is in close proximity to mobile device 100. Bluetooth transceiver 137 and NFC transceiver 138 allow for mobile device 100 and user-wearable device 300 to transmit and receive instructions and data from each other.

In one embodiment, processor IC 302 links the user-wearable device 300 to the mobile device 100 via a communication mechanism. Processor IC 302 receives a communication of an image capture request and in response to receiving the image capture request, processor IC 302 triggers image capture device 360 to capture an image within the field of view of image capture device 360. Processor IC 302 causes the transmission of information to the mobile electronic device 100 that enables the electronic device to determine whether the user-wearable device 300 is being utilized to actively view the display of the mobile device. The mobile device utilizes the information in determining whether to transition the display 125 to a sleep state or to extend a current active state of the display.

Figure 5:
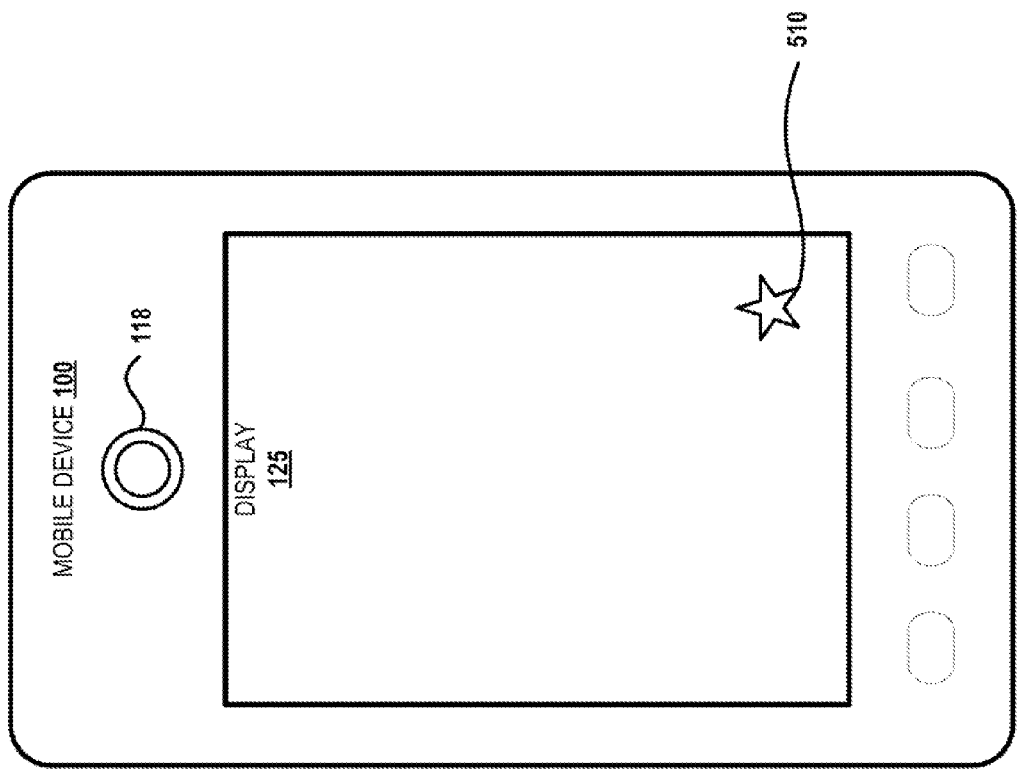
FIG. 5 illustrates a screen shot of an example electronic device display, according to one embodiment.

Referring to FIG. 5, an example screen shot of display 125 of mobile device 125 is shown. Processor IC 102 can display a specific image or icon 510 on display 125. Icon 510 can be a wide variety of shapes or images. In the presented embodiment, icon 510 is a star shape. In other embodiments, icon 510 can be letters, numbers, shapes, characters or animated figures.

In an example embodiment, processor IC 102 determines whether the sleep state timer has less than a threshold time remaining 194 before the timer expires. In response to determining that the sleep state timer has less than the threshold time remaining, processor IC 102 causes the specific icon 510 to be shown on display 125.

Figure 6:
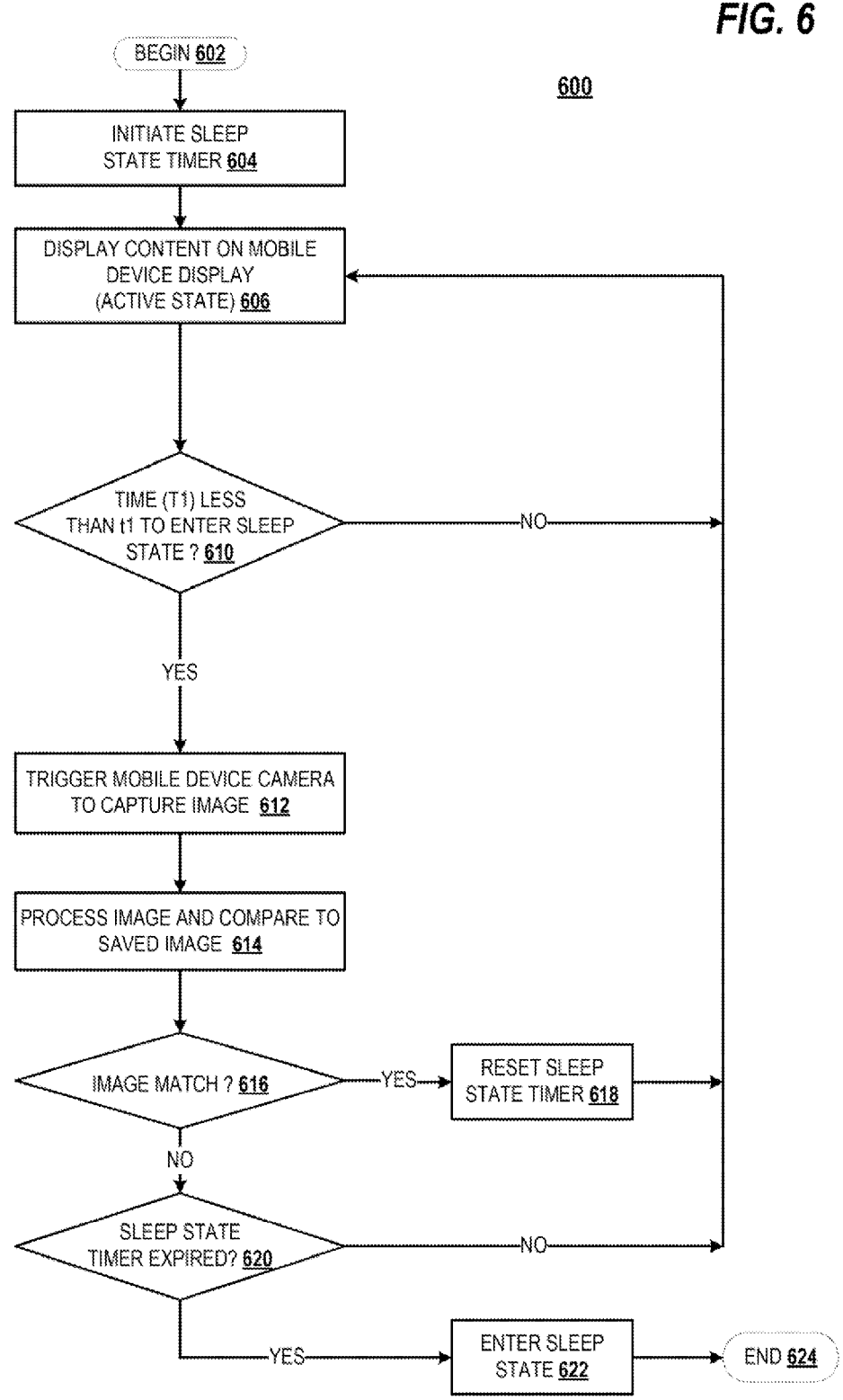
FIG. 6 provides a flowchart illustrating the method by which the mobile device determines whether the display is being actively viewed based on the location and orientation of the external user-wearable device, according to one embodiment.

FIGS. 6-9 illustrate flowcharts of exemplary methods for regulating the time-out characteristics of mobile electronic device display 125. Specifically, FIG. 6 illustrates a flowchart of an exemplary method by which mobile device 100 determines whether the display 125 is being actively viewed based on the location and orientation of the external user-wearable device 170 according to an illustrative embodiment. Method 600 can be implemented in mobile device 100 via processor IC 102 from display control module 114 and image processing utility 115. As shown in FIG. 2, software instructions and code to execute method 600 can be stored in memory 110 for execution by processor IC 102.

The method of FIG. 6 begins at block 602. Processor IC 102 initiates the sleep state timer 190 (block 604). Upon expiration, the sleep state timer 190 triggers the display to transition from an active state to a non-functional sleep state. Processor IC 102 displays content on mobile device display 125 (block 606). Display 125 is in an active state when content is being shown on display 125. Processor IC 102 determines whether the sleep state timer 190 time remaining (T1) 192 is less than a threshold (t1) 194 before the timer expires (block 610). In response to determining that the sleep state timer 190 time remaining (T1) 192 is greater than the threshold (t1) 194, processor IC 102 continues to display content on mobile device display 125 (block 606). In response to determining that the sleep state timer 190 time remaining (T1) 192 is less than threshold (t1) 194, processor IC 102 triggers image capture device 118 to capture an image of a viewing space in front of display 125 (block 612).

Processor IC 102 processes the image and analyzes the captured image to determine whether the user-wearable device 170 is at a location and has an orientation relative to the display screen 125 that corresponds to active viewing of the display screen by the user-wearable device 170 (block 614). According to one or more embodiments, the "location" of the user-wearable device 170 can refer to a distance from the mobile device 100. One aspect of the disclosure thus provides that if the user-wearable device 170 is beyond a certain threshold distance from the mobile device 100, a determination can be made that the user is too far away to be actively viewing the display 125, and the mobile device 100 will transition to a sleep state. It is further appreciated that the location of the user-wearable device 170 can determine whether the image capture device 118 is able to actually capture an image of the user-wearable device 170. For example, the user-wearable device 170 can be at a position that is not in front of the mobile device 100 (e.g., located behind or to the sides out of the viewing angle of the image capture device 118), such that no image of the user-wearable device 170 is captured by the image capture device 118. Thus, determination of orientation occurs only when the user-wearable device 170 is at a location in front of the mobile device 100. Further, according to one or more embodiments, the "orientation" of the user-wearable device 170 can refer to a position and/or angle of the user-wearable device 170 relative to an imaginary perpendicular line extending from the display 125 of mobile device 100. FIGS. 10-12 provide three different orientations of user-wearable device 170 and the resulting image captured by the image capture device 118 showing the relative orientation of the user-wearable device 170 to the display 125. Each illustration provides user-wearable device 170 at a location that is in front of and within the threshold distance away from mobile device 100, and within a viewing range of the image capture device 118. Turning to FIG. 10, user-wearable device 170 is shown in a first orientation 1000 in which the user 1005 is actively viewing the display 125 of mobile device 100. Imaginary perpendicular line 1015 shows the angle from which image capture device 118 captures the image of user-wearable device 170 on the face of user 1005. While user-wearable device 170 is in that first orientation 1000, image capture device 118 captures image 1010, which is then processed to determine whether the user is actively viewing display 125. In FIG. 10, the captured image 1010 includes user wearable device 170 located on a person's face 1005 and has an orientation, determined, in one embodiment, based on imaginary perpendicular line 1015, such that the frontal view of the user wearable device 170 is substantially parallel to the plane of the display 125. An image 1010 of the user wearable device located on a person's face and oriented such that the frontal view of the user wearable device 170 is within an acceptable angle of being substantially parallel to the plane of the display 125 may correspond to active viewing of the display 125 by the user-wearable device 170.

Referring back to FIG. 6, processor IC 102 determines whether the captured image is of a user wearable device 170 located within the threshold distance and at a position and an orientation relative to the display 125 that corresponds to active viewing of the display 125 (block 616). In response to determining that the captured image is of a user wearable device 170 at a location and with an orientation relative to the display 125 that corresponds to active viewing of the display 125, processor IC 102 resets the sleep state timer 190 (block 618) and then continues to display content on mobile device display 125 (block 606). In response to determining that the captured image is of a user wearable device 170 that is not located and/or does not have an orientation relative to the display 125 that corresponds to active viewing of the display 125, processor IC 102 determines whether the sleep state timer 190 has expired (block 620). For example, user wearable device 170 may not be located on a person's face. As another example, user wearable device 170 may be located on a person's face, but may be oriented such that the frontal view of user wearable device 170 is not parallel to the plane of the display 125 (i.e., the person may be looking upward, looking downward or otherwise looking away from the display 125).

FIGS. 11 and 12 provide two examples of this example scenario. Turning to FIG. 11, user-wearable device 170 is shown in a second orientation 1100 in which the user is not actively viewing the display 125 of mobile device 100. While user-wearable device 170 is in that second orientation 1100, image capture device 118 captures image 1110, which is processed to determine whether the user is actively viewing display 125. In FIG. 11, the captured image 1110 includes the user wearable device 170 located on a person's face 1005, but at an orientation, that may be determined based on imaginary perpendicular line 1115, such that the frontal view of the user wearable device 170 is looking upwards and away from the display 125, as indicated by second dashed line 1120. Similarly, in FIG. 12, user-wearable device 170 is shown in a third orientation 1200 in which the user 1005 is not actively viewing the display 125 of mobile device 100. While user-wearable device 170 is in that third orientation 1200, image capture device 118 captures image 1210, which is processed to determine whether the user is actively viewing display 125. In FIG. 12, the captured image 1210 includes the user wearable device 170 located on a user's face 1005, but at an orientation, that may be determined based on imaginary perpendicular line 1215, such that the frontal view of the user wearable device 170 is looking sideways, away from the display 125. It is appreciated that the analysis of the captured images 1010, 1110, and 1210 requires a comparison to pre-programmed image data that can, in at least one embodiment, indicate the presence of both a user as well as of the image capture device. Thus, if any one of the captured images 1010, 1110, and 1210 provided only the image capture device without the image characteristics of a user, then the display 125 of mobile device 100 would still transition to the sleep state, regardless of the location and/or orientation of user-wearable device 170.

Referring back to FIG. 6, in response to determining that the sleep state timer 190 has not expired, processor IC 102 continues to display content on mobile device display 125 (block 606). In response to determining that the sleep state timer 190 has expired, processor IC 102 causes display 125 to transition to or enter a non-functional sleep state (block 622). Method 600 ends at block 624.

Figure 7:
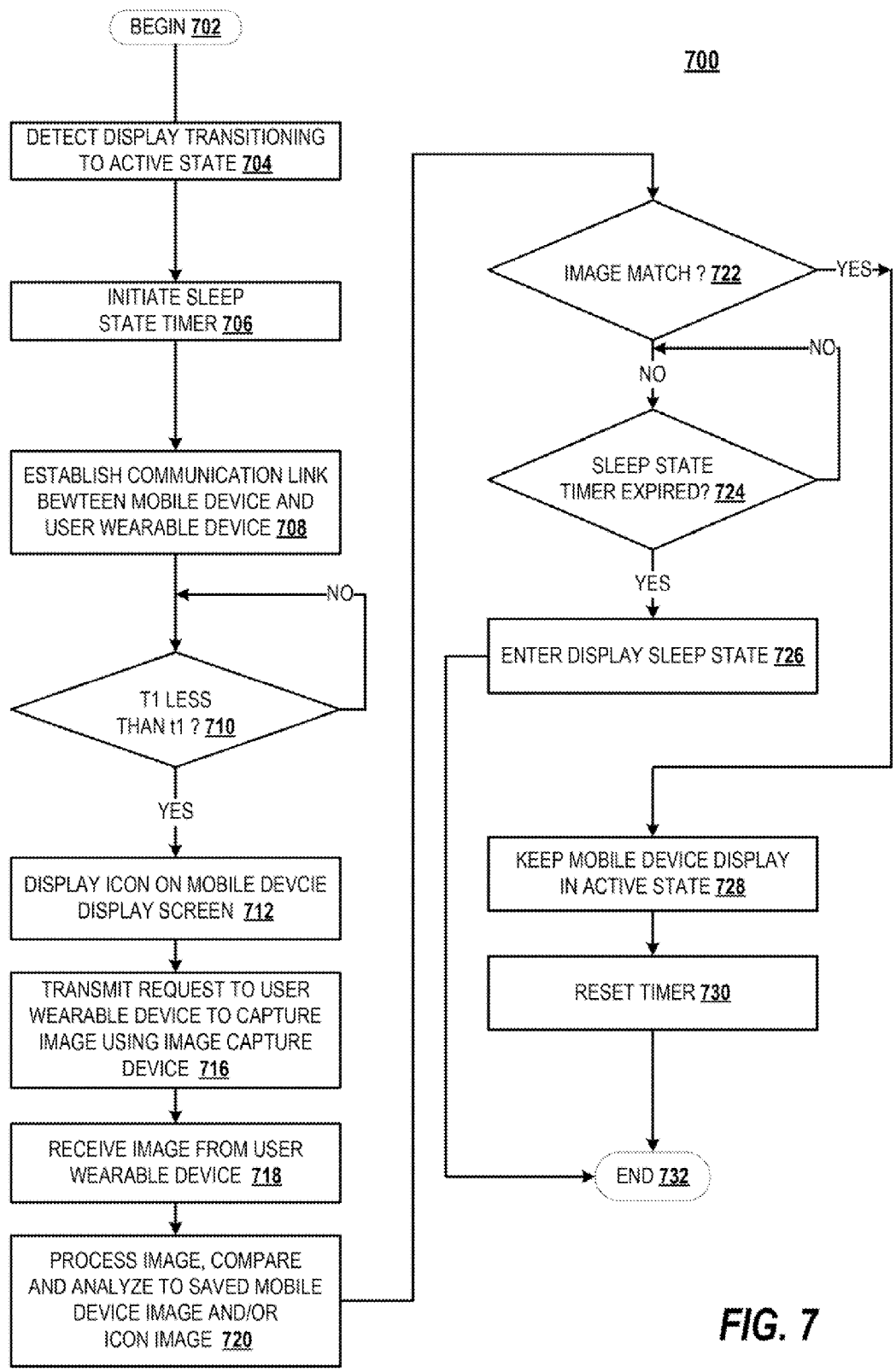
FIG. 7 provides a flowchart illustrating the method by which the mobile device receives an image from the user-wearable device and determines whether the display is being actively viewed based on the image, according to one embodiment.

FIG. 7 illustrates a flowchart of an exemplary method by which mobile device 100 determines whether the display 125 is being actively viewed based on a received image from the external user-wearable device 300 according to an illustrative embodiment. Method 700 can be implemented in mobile device 100 via processor IC 102 execution of code from display control module 114 and image processing utility 115. As shown in FIG. 2A, software instructions and code to execute method 700 can be stored on memory 110 for execution by processor IC 102.

The method of FIG. 7 begins at block 702 and proceeds to block 704 at which processor IC 102 detects that display 125 has transitioned to an active state. In response to detecting display 125 transitioning to an active state, processor IC 102 initiates the sleep state timer 190 (block 706). Upon expiration, the sleep state timer 190 triggers the display to transition from an active state to a non-functional sleep state. At block 708, processor IC 102 establishes a communication link linking the electronic device 100 to the user wearable device 300 via a communication mechanism (e.g., Bluetooth/NFC 137/138). Processor IC 102 determines whether the sleep state timer 190 time remaining (T1) 192 is less than a threshold (t1) 194 before the timer expires (block 710). In response to determining that the sleep state timer 190 time remaining (T1) 192 is greater than the threshold (t1) 194, processor IC 102 continues to determine whether the sleep state timer 190 time remaining (T1) 192 is less than a threshold time remaining (t1) 194 before the timer expires (block 710). In response to determining that the sleep state timer 190 time remaining (T1) 192 is less than the time remaining threshold (t1) 194, processor IC 102 displays a pre-established icon 510 on display 125 (block 712).

Processor IC 102 transmits a request to the user-wearable device 300 to capture an image of the user-wearable device's field of view using image capture device 360 (block 716). Processor IC 102 receives the captured image from the user-wearable device 300 at block 718. Processor IC 102 processes the captured image and analyzes and/or compares the captured image to a previously saved mobile device display image 119 and/or a saved icon image 117 (block 720). Processor IC 102 analyzes the image received from user-wearable device 300 to determine whether the captured image includes a view of at least a portion of the display 125 or the pre-established icon 510. The captured image containing at least a portion of the display 125 or icon 510 within the captured image is indicative that the display 125 is being actively viewed.

Processor IC 102 determines whether the captured image at least partially matches the saved mobile device display image 119 or the saved icon image 117 (block 722). In response to determining that the captured image at least partially matches either the saved mobile device display image 119 or the saved icon image 117, processor IC 102 decides that the display 125 is being actively viewed by the user-wearable device 300 and keeps the display 125 in an active state (block 728). Processor IC 102 resets the sleep state timer 190 at block 730. Method 700 then terminates at block 732. In response to determining that the captured image does not match either the saved mobile device display image 119 or the saved icon image 117, processor IC 102 decides that the display 125 is not being actively viewed by the user-wearable device 300 and determines whether the sleep state timer 190 has expired (block 724). In response to determining that the sleep state timer 190 has not expired, processor IC 102 continues to determine whether the sleep state time has expired (block 724). When the sleep state timer 190 has expired, processor IC 102 causes display 125 to transition to or enter a non-functional sleep state (block 726). Method 700 ends at block 732.

Figure 8:
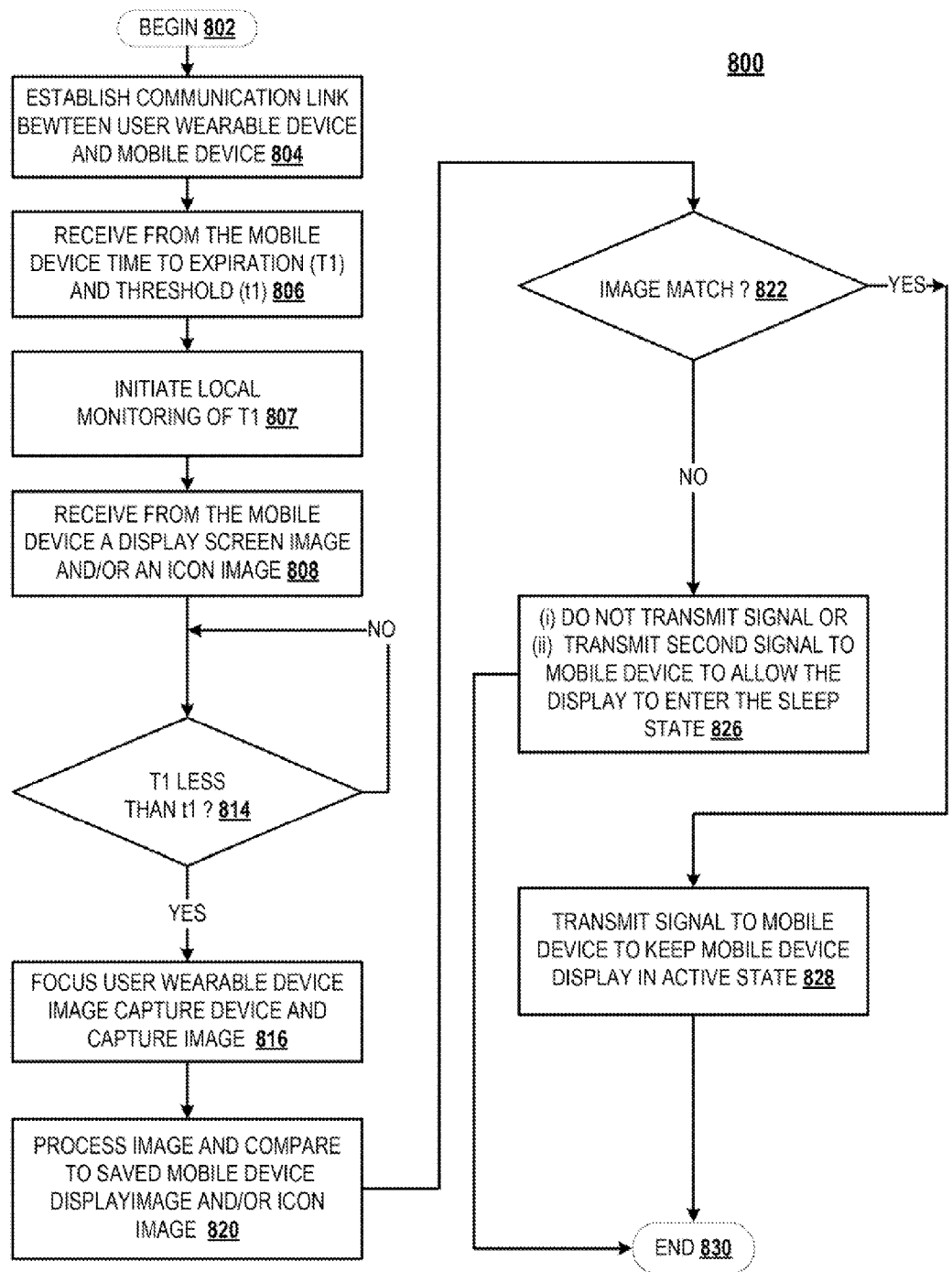
FIG. 8 provides a flowchart illustrating the method by which the user-wearable device determines whether the display is being actively viewed, according to one embodiment.

FIG. 8 illustrates a flowchart of an exemplary method by which external user-wearable device 300 determines whether the display 125 is being actively viewed and transmits a signal to mobile electronic device 100, according to an illustrative embodiment. Method 800 can be implemented in user-wearable device 300 via processor IC 302 from image processing utility 314 and visual activity confirmation module 316. As shown in FIG. 4, software instructions and code to execute method 800 can be stored in memory 310 for execution by processor IC 302.

The method of FIG. 8 begins at block 802. Processor IC 302 establishes a communication link linking the user wearable device 300 to the electronic device 100 via communication mechanism 337/338 (block 804). Processor IC 302 receives from the electronic device 100 via communication mechanism 337/338: (i) sleep state timer 190 time remaining (T1) 192 that represents the maximum value remaining of the sleep state timer and (ii) the time remaining threshold (t1) 194 (block 806). Processor IC 302 initiates local monitoring of the time remaining value T1 (192) before expiration of the sleep state timer (block 807). At block 808, processor IC 302 receives from electronic device 100 mobile device display image 119 and/or icon image 117 and saves display image 119 to memory 310 as display image 319 and/or saves icon image 117 to memory 310 as icon image 318.

Processor IC 302 determines whether the time remaining (T1) is less than the time remaining threshold (t1) before the timer expires (block 814). In response to determining that the time remaining (T1) is not less than the time remaining threshold (t1), processor IC 302 continues to determine whether the time remaining (T1) is less than the time remaining threshold (t1) (block 814). When the time remaining (T1) is less than the time remaining threshold (t1), processor IC 302 triggers the image capture device 360 to focus and to capture an image within a field of view of the image capture device 360 (block 816). Processor IC 302 processes the captured image and analyzes and/or compares the captured image to display image 319 and/or icon image 318 (block 820). Processor IC 302 analyzes the image from image capture device 360 to determine whether the captured image includes a view of at least a portion of the display 125 or the pre-established icon 510. The captured image containing at least a portion of the display 125 or icon 510 within the captured image is indicative that the display is being actively viewed.

Processor IC 302 determines whether the captured image at least partially matches the mobile device display image 319 or the icon image 318 (block 822). In response to determining that the captured image at least partially matches either the mobile device display image 319 or the icon image 318, processor IC 302 decides that the display 125 is being actively viewed by the user-wearable device 300 and transmits a first signal via communication mechanism (337/338) to mobile electronic device 100 to keep the display 125 in an active state or to extend the current active state of the display (block 828). Method 800 then terminates at block 830. In response to determining that the captured image does not match either the mobile device display image 319 or the icon image 318, processor IC 302 decides that the display 125 is not being actively viewed by the user-wearable device 300 and either (i) does not transmit the first signal to mobile electronic device 100, in a first embodiment, or (ii) transmits a second signal, different from the first signal, to mobile electronic device 100, to allow the display 125 to enter the non-functional sleep state (block 826). Method 800 ends at block 830.

Figure 9:
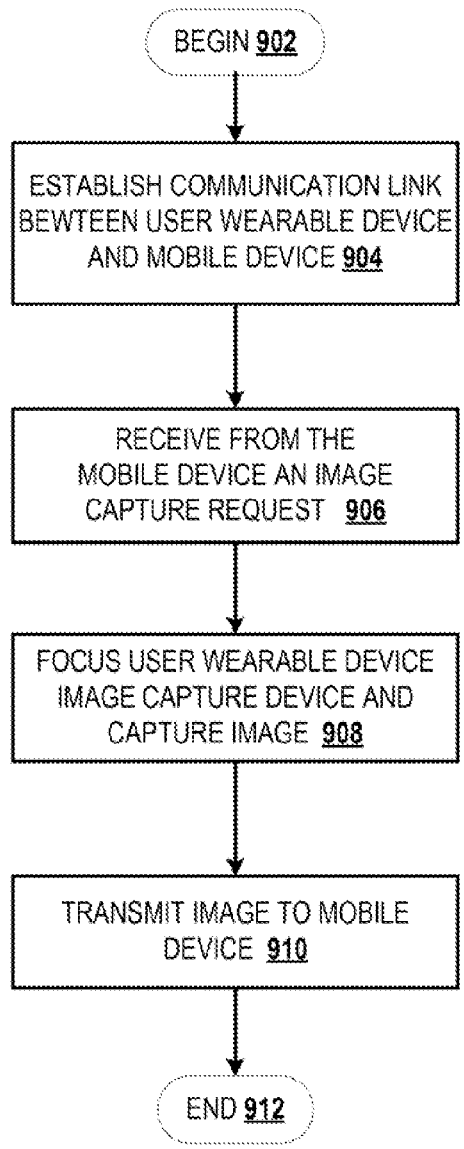
FIG. 9 provides a flowchart illustrating the method by which the user-wearable device receives an image capture request and transmits an image, according to one embodiment.

FIG. 9 illustrates a flowchart of an exemplary method process by which external user-wearable device 300 receives an image capture request and transmits an image to mobile electronic device 100 according to an illustrative embodiment. Method 900 can be implemented in user-wearable device 300 via processor IC 302 execution of code from image processing utility 314 and visual activity confirmation module 316. As shown in FIG. 4, software instructions and code to execute computer implemented method 900 can be stored on memory 310 for execution by processor IC 302.

The method of FIG. 9 begins at block 902. Processor IC 302 establishes a communication link linking the user wearable device 300 to the electronic device 100 via communication mechanism 337/338 (block 904). Processor IC 302 receives from the electronic device 100 a request to capture an image of the user-wearable device's field of view using image capture device 360 (block 906). Processor IC 302 triggers the image capture device 360 to focus and to capture an image within a field of view (block 908). Processor IC 302 transmits the captured image via communication mechanism 337/338 to mobile electronic device 100 (block 910). Method 900 then ends at block 912. The transmitted captured image enables the requesting electronic device to determine whether the user-wearable device is being utilized to actively view the display of the electronic device. The electronic device utilizes the captured image information in determining whether to transition the display to a sleep state or to extend a current active state of the display.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, or method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all functional elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   displaying, by an electronic device, an icon at a display;
   initiating, by the electronic device, a sleep state timer of the electronic device that is configured to trigger, upon expiration, the display of the electronic device to transition from an active state to a sleep state;
   determining, by the electronic device, whether a time to expiration of the sleep state timer is less than a time remaining threshold; and
   responsive to determining that the time to expiration is less than the time remaining threshold:
      responsive to transmitting an image capture request to a wearable device, receiving, by the electronic device, from the wearable device, a captured image of the display of the electronic device;
      determining, by the electronic device, based on the captured image of the display, whether the display is actively being viewed by a user by at least determining whether the captured image received from the wearable device includes an icon image of the icon at the display of the electronic device;
      enabling, by the electronic device, the display to transition to the sleep state at expiration of the sleep state timer in response to determining that the display is not actively being viewed by at least determining that the captured image does not include the icon image of the icon at the display; and
      resetting, by the electronic device, the sleep state timer in response to determining that the display is actively being viewed by the user by at least determining that the captured image includes the icon image of the icon at the display.

2. The method of claim 1, wherein determining whether the display is being actively viewed comprises analyzing, by the electronic device, the captured image of the display to determine if the wearable device is within a specific orientation relative to the display.

3. The method of claim 1, wherein determining whether the display is being actively viewed comprises
   analyzing, by the electronic device, the captured image of the display received to determine whether at least a portion of the display is within a field of view of the wearable device; and
   responsive to determining that the at least a portion of the display is within the field of view, determining, by the electronic device, that the display is actively being viewed.

4. The method of claim 3, further comprising:
   responsive to determining that the at least a portion of the display is not within the field of view, determining, by the electronic device, that the display is not actively being viewed.

5. An electronic device comprising:
   a display;
   a processor operatively coupled to the display:
   a communication component that communicatively links the electronic device to a wearable device;
   a memory having a first set of instructions that, when executed by the processor, triggers the display to enter into an active state;
   a display control module having a second set of instructions that, when executed by the processor, cause the processor to:
      display an icon at the display;
      initiate a sleep state timer of the electronic device that is configured to trigger, upon expiration, the display to transition from the active state to a sleep state;
      determine whether a time to expiration is less than a time remaining threshold;
      responsive to determining that the time to expiration is less than the time remaining threshold:
         responsive to transmitting an image capture request to the wearable device, receive, from the wearable device, a captured image of the display of the electronic device
         determine, based on the captured image of the display, whether the display is actively being viewed by a user by at least determining whether the captured image received from the wearable device includes an icon image of the icon at the display of the electronic device;
         enabling the display to transition to the sleep state at expiration of the sleep state timer in response to determining that the display is not actively being viewed by at least determining that the captured image does not include the icon image of the icon at the display; and
         resetting the sleep state timer in response to determining that the display is actively being viewed by the user by at least determining that the captured image includes the icon image of the icon at the display.

6. The electronic device of claim 5, wherein the captured image is a first captured image, the electronic device further comprising:
   an image capture component, wherein to determine whether the display is actively being viewed, the second set of instructions, when executed, further cause the processor to:
      capture a second captured image of a viewing space in front of the display; and analyze the second captured image to determine whether the wearable device is within a specific orientation relative to the display.

7. The electronic device of claim 5, wherein to determine whether the display is actively being viewed, the second set of instructions, when executed, further cause the processor to:
   analyze the captured image received from the wearable device to determine whether at least a portion of the display is within a field of view of the wearable device; and
   responsive to determining that the at least a portion of the display is within the field of view, determine that the display is actively being viewed.

8. The electronic device of claim 7, wherein the second set of instructions of the display control module, when executed by the processor, further cause the processor to:
   responsive to determining that the at least a portion of the display is not within the field of view, determine that the display is not actively being viewed.

\* \* \* \* \*